(12) United States Patent
Watada et al.

(10) Patent No.: US 11,615,146 B2
(45) Date of Patent: Mar. 28, 2023

(54) INFORMATION PROCESSING DEVICE, INFORMATION PROCESSING SYSTEM, AND CONTROL METHOD THEREOF

(71) Applicant: TOSHIBA TEC KABUSHIKI KAISHA, Tokyo (JP)

(72) Inventors: Shogo Watada, Sunto Shizuoka (JP); Naoki Sekine, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 227 days.

(21) Appl. No.: 17/179,337

(22) Filed: Feb. 18, 2021

(65) Prior Publication Data

US 2021/0294856 A1 Sep. 23, 2021

(30) Foreign Application Priority Data

Mar. 17, 2020 (JP) ................................ 2020-046336

(51) Int. Cl.
| | |
|---|---|
| *G10L 15/22* | (2006.01) |
| *G06F 16/9032* | (2019.01) |
| *G06F 16/903* | (2019.01) |
| *G06Q 20/20* | (2012.01) |
| *G10L 13/027* | (2013.01) |

(52) U.S. Cl.
CPC .. *G06F 16/90332* (2019.01); *G06F 16/90344* (2019.01); *G06Q 20/209* (2013.01); *G10L 13/027* (2013.01); *G10L 15/22* (2013.01); *G10L 2015/223* (2013.01)

(58) Field of Classification Search
CPC ......... G06F 16/90332; G06F 16/90344; G06F 16/3329; G06F 16/332; G06F 16/3343; G06F 16/3344; G06Q 20/209; G06Q 20/18; G06Q 20/20; G06Q 50/12; G10L 13/027; G10L 15/22; G10L 2015/223; G10L 25/54; G10L 2015/225

See application file for complete search history.

(56) References Cited

U.S. PATENT DOCUMENTS

| | | | |
|---|---|---|---|
| 11,348,160 B1* | 5/2022 | Shukla | G06N 5/022 |
| 2008/0133244 A1* | 6/2008 | Bodin | G10L 15/22 |
| | | | 704/E15.04 |
| 2008/0275704 A1* | 11/2008 | Portele | G10L 15/22 |
| | | | 704/E15.04 |

(Continued)

FOREIGN PATENT DOCUMENTS

JP 2019-106154 A1 6/2019

*Primary Examiner* — Abul K Azad
(74) *Attorney, Agent, or Firm* — Kim & Stewart LLP

(57) ABSTRACT

An information processing device includes a network interface and a processor. The processor is configured to: acquire voice data via the network interface, analyze the acquired voice data, based on a result of the analysis, determine a search condition including one or more keywords for searching for one or more items, perform a search using the determined search condition, generate a first text indicating an item found by the search, and controls the network interface to output the generated first text. The processor is further configured to, when two or more items are found by the search, generate a second text suggesting another keyword other than said one or more keywords that have been used for the search, and controls the network interface to output the generated second text.

20 Claims, 10 Drawing Sheets

(56) References Cited

U.S. PATENT DOCUMENTS

2012/0296635 A1* 11/2012 Brockett ............... G06F 40/166
704/9
2020/0278987 A1* 9/2020 Liu ................... G06F 16/90324

* cited by examiner

| ID | MENU ITEM NAME |
|---|---|
| 1 | AAA |
| 2 | BBB |
| 3 | CCC |
| 4 | DDD |
| 5 | EEE |
| 6 | FFF |
| 7 | GGG |
| ⋮ | ⋮ |

FIG. 5

| ID | MENU ITEM NAME | SLOT 1 (TYPE) | SLOT 2 (FOOD INGREDIENT) | SLOT 3 (TASTE) | SLOT 4 (CALORIES) | ... | SLOT M (TEMPERATURE) | SUGGESTION DEGREE |
|---|---|---|---|---|---|---|---|---|
| 1 | AAA | CURRY, STAPLE FOOD | BEEF, POTATO | SPICY | HIGH | ... | WARM | 3 |
| 2 | BBB | PASTA | TOMATO, OCTOPUS | REFRESHING | LOW | ... | WARM | 4 |
| 3 | CCC | ROAST | BEEF, CHICKEN | MILD | HIGH | ... | WARM | 4 |
| 4 | DDD | ROAST | CHICKEN | REFRESHING | LOW | ... | WARM | 5 |
| 5 | EEE | SALAD | HAM, LETTUCE | REFRESHING | LOW | ... | COLD | 5 |
| 6 | FFF | DESSERT | MANDARIN ORANGE, STRAWBERRY | SWEET | HIGH | ... | WARM | 3 |
| 7 | GGG | DRINK | MEAT | REFRESHING | LOW | ... | COLD | 5 |
| ⋮ | ⋮ | ⋮ | ⋮ | ⋮ | ⋮ | ... | ⋮ | ⋮ |

FIG. 6

| SLOT | SLOT NUMBER | ALIAS INFORMATION |
|---|---|---|
| PASTA | SLOT 1 | PASTA, SPAGHETTI |
| CURRY | SLOT 1 | CURRY, KARI |
| DESSERT | SLOT 1 | DESSERT, SWEETS, DOLCE |
| ⋮ | ⋮ | ⋮ |
| WARM | SLOT M | WARM, HOT, MODERATE TEMPERATURE, HIGH TEMPERATURE |

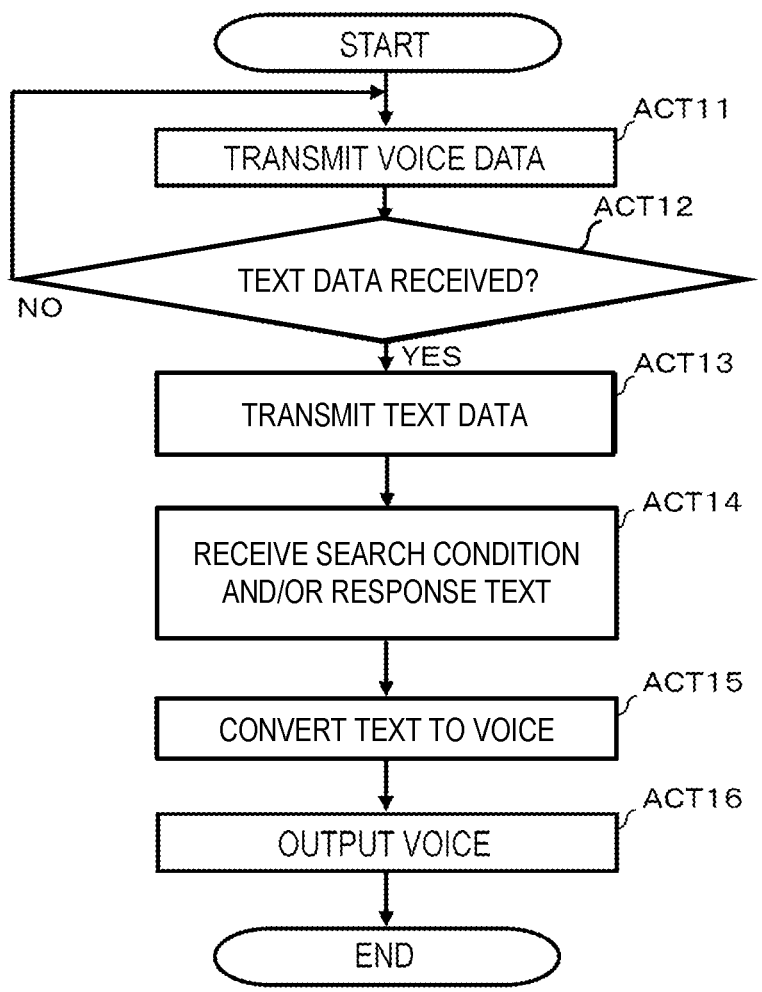

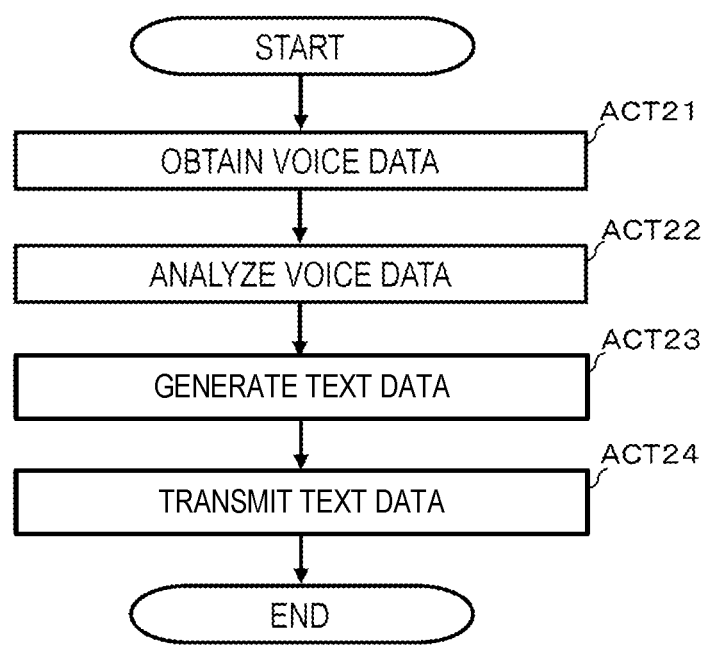

INFORMATION PROCESSING DEVICE, INFORMATION PROCESSING SYSTEM, AND CONTROL METHOD THEREOF

CROSS-REFERENCE TO RELATED APPLICATION

This application is based upon and claims the benefit of priority from Japanese Patent Application No. 2020-046336, filed on Mar. 17, 2020, the entire contents of which are incorporated herein by reference.

FIELD

Embodiments described herein relate generally to an information processing device, an information processing system, and a control method thereof.

BACKGROUND

In recent years, in restaurants, so-called self-ordering terminals that allow customers to place an order by themselves have been introduced. Some terminals have a microphone to accept a voice command from the customers. For example, if a customer speaks a keyword to the microphone, one or more menu items correlated to the keyword can be searched and possibly suggested for the order. However, if the customer does not have a specific idea about what to eat or drink, he or she does not have the keyword in his or her mind. As a result, the terminal cannot perform the search and make a suggestion about menu items that may be desired by the customer.

BRIEF DESCRIPTION OF THE DRAWINGS

FIG. 3 is a schematic view illustrating a data structure of a menu database.

FIG. 5 is a schematic view illustrating a data structure of a menu database.

FIG. 6 is a schematic view illustrating a data structure of a search slot database.

FIG. 7 is a flowchart of a control procedure carried out by a voice dialogue server according to one embodiment.

FIG. 8 is a flowchart of a control procedure carried out by a voice dialogue server according to one embodiment.

DETAILED DESCRIPTION

Embodiments provide an information processing device, an information processing system, and a control method thereof with which a menu item desired by a customer can be searched in a dialogue form by voice.

In general, according to one embodiment, an information processing device includes a network interface and a processor. The processor is configured to: acquire voice data via the network interface, analyze the acquired voice data, based on a result of the analysis, determine a search condition including one or more keywords for searching for one or more items, perform a search using the determined search condition, generate a first text indicating an item found by the search, and controls the network interface to output the generated first text. The processor is further configured to, when two or more items are found by the search, generate a second text suggesting another keyword other than said one or more keywords that have been used for the search, and controls the network interface to output the generated second text.

Hereinafter, certain example embodiments are described with reference to the drawings.

Figure 1:
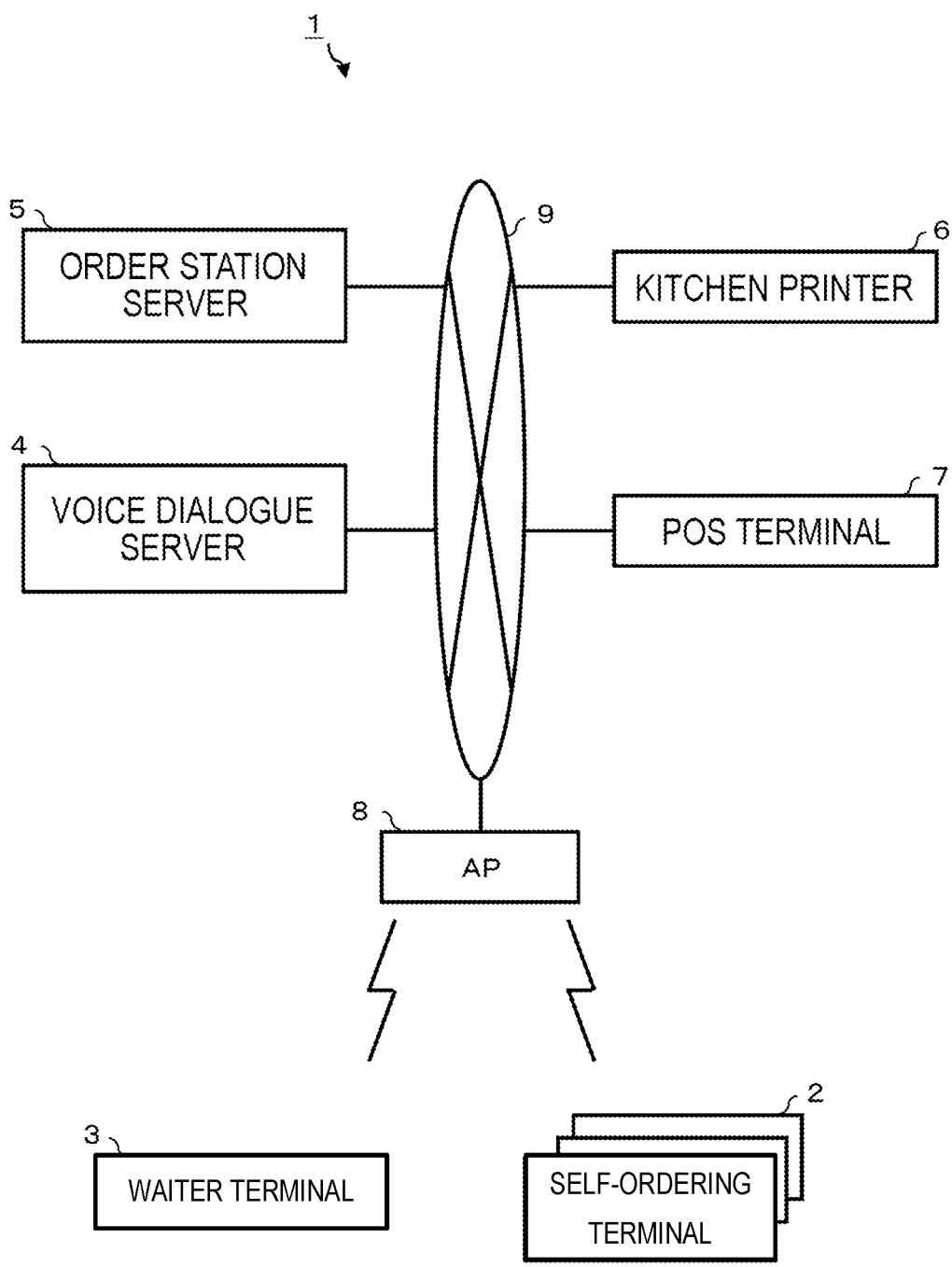
FIG. 1 is a schematic view illustrating an information processing system according to one embodiment.

FIG. 1 is a schematic view illustrating an information processing system 1 according to one embodiment.

The information processing system 1 includes one or more self-ordering terminal 2, a waiter terminal 3, a voice dialogue server 4, an order station server 5, a kitchen printer 6, a POS (Point-Of-Sale) terminal 7, and an access point (AP) 8. The voice dialogue server 4, the order station server 5, the kitchen printer 6, the POS terminal 7, and the access point 8 are connected to a network 9 such as a Local Area Network (LAN) or the like. The access point 8 relays communication of each device connected to the network 9, that is, the voice dialogue server 4, the order station server 5, the kitchen printer 6, and the POS terminal 7 with the self-ordering terminal 2 and the waiter terminal 3. FIG. 1 illustrates one access point 8, but two or more thereof may be provided depending on the size or the like of a store or a restaurant where the information processing system 1 is used.

The self-ordering terminal 2 is provided on each table provided in a restaurant or a store (hereinafter referred to as the restaurant). The self-ordering terminal 2 is a device with which a user as a customer places an order without a waiter or waitress or a store clerk (hereinafter referred to as the waiter for simplicity) while sitting at a table. The waiter terminal 3 is carried by a waiter in the restaurant. The waiter terminal 3 is a device that supports the work performed by the waiter.

The voice dialogue server 4 is a device that performs a voice recognition process and a dialogue control process. The voice recognition process is a process of mainly converting a voice that is input to the self-ordering terminal 2 by the customer into text data. The dialogue control process is a process of mainly analyzing and recognizing the text data and performing the control corresponding to the recognized text. The order station server 5 is a device that performs an order process.

The kitchen printer 6 is provided in the kitchen. The kitchen printer 6 is a device of outputting an order slip displaying information according to a menu item ordered by the customer. The POS terminal 7 is a device of enabling a waiter or the customer to check out the ordered items. The number of the POS terminals 7 is not particularly limited. The payment method is not particularly limited. For example, payment may be made by cash, credit card, and electronic money. Two or more payment methods may be accepted by the POS terminal 7.

Figure 2:
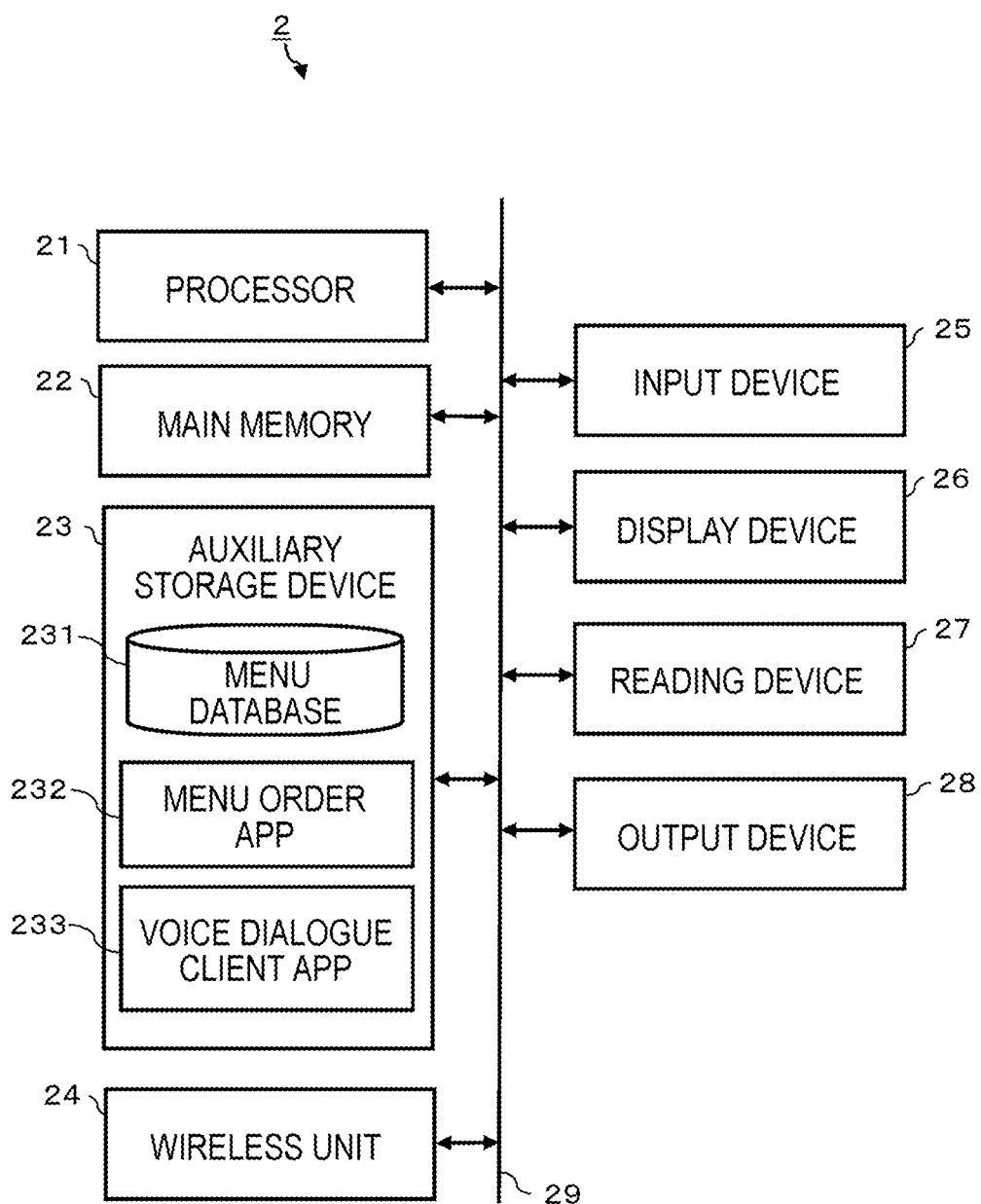
FIG. 2 is a block diagram illustrating a self-ordering terminal according to one embodiment.

FIG. 2 is a block diagram illustrating the self-ordering terminal 2. The self-ordering terminal 2 includes a processor 21, a main memory 22, an auxiliary storage device 23, a wireless unit 24, an input device 25, a display device 26, a reading device 27, an output device 28, and a system transmission line 29. The system transmission line 29 includes an address bus, a data bus, a control signal line, and the like. In the self-ordering terminal 2, the processor 21, the main memory 22, the auxiliary storage device 23, the wireless unit 24, the input device 25, the display device 26, the reading device 27, and the output device 28 are connected to the system transmission line 29. In one embodiment, the processor 21, the main memory 22, the auxiliary storage device 23, and the system transmission line 29 make up a controller.

The processor 21 controls each unit so as to perform various functions as the self-ordering terminal 2 according to an operating system and/or application programs. The processor 21 is, for example, a central processing unit (CPU).

The main memory 22 includes a non-volatile memory area and a volatile memory area. The operating system and/or the application programs are stored in the non-volatile memory area. The data required by the processor 21 for executing a process of controlling each unit is stored in the non-volatile memory area and/or the volatile memory area. The volatile memory area is used as a work area in which data is temporarily stored by the processor 21. The non-volatile memory area is, for example, a read only memory (ROM). The volatile memory area is, for example, a random access memory (RAM).

The auxiliary storage device 23 may be, for example, EEPROM (Electric Erasable Programmable Read-Only Memory), a hard disc drive (HDD), or a solid state drive (SSD). The auxiliary storage device 23 stores data used by the processor 21 for executing various processes, data generated by the process in the processor 21, or the like. The auxiliary storage device 23 stores a menu database 231 (see FIG. 3). The auxiliary storage device 23 may store information processing programs. The information processing programs stored in the auxiliary storage device 23 includes a menu order application program 232 (hereinafter, referred to as a menu order app 232), and a voice dialogue client application program 233 (hereinafter, referred to as a voice dialogue client app 233).

The menu order app 232 is an application program that searches for a menu item or changes screen display information based on a touch operation on the self-ordering terminal 2 by the customer. The voice dialogue client app 233 is an application program that transmits a voice that is input from the input device 25 to the voice dialogue server 4 and receives an analysis result thereof.

The application program stored in the main memory 22 or the auxiliary storage device 23 includes one or more control programs relating to the information process executed in the self-ordering terminal 2. The method of installing the control programs in the main memory 22 or the auxiliary storage device 23 may not be particularly limited. The control program may be copied from a removable recording medium or downloaded via the network and installed in the main memory 22 or the auxiliary storage device 23. The form of the recording medium is not particularly limited as long as the recording medium can store a program and can be read by a device. For example, the recording medium is a CD-ROM, a memory card, or the like.

The wireless unit 24 performs wireless communication of data with the access point 8 according to a wireless communication protocol.

The input device 25 is a device for the customer to input a command or instruction to the self-ordering terminal 2. For example, the input device 25 is a keyboard, a touch panel, a microphone, or the like.

The display device 26 is a device that can display various screens by the control of the processor 21. For example, the display device 26 is a liquid crystal display or an electroluminescence (EL) display. In one embodiment, the input device 25 is integrated into the display device 26 to form a touch-enabled display.

The reading device 27 is a device that can read various kinds of data. For example, the reading device 27 is a card reader that can read data from a contact type IC card. For example, the reading device 27 is a reader that can read data from a recording medium that uses a non-contact type IC card or a Radio Frequency Identification (RFID) chip or tag. For example, the reading device 27 is a card reader that can read data from a magnetic stripe of a card medium. For example, the reading device 27 is a scanner that can read data from a code symbol. The code symbol is a two-dimensional code symbol such as a barcode symbol and a QR code®. The scanner may read a code symbol by scanning the laser light or by reading a code symbol from an image imaged by the imaging device.

The output device 28 is a device that can output a sound from the self-ordering terminal 2. For example, the output device 28 is a speaker.

FIG. 3 is a schematic view illustrating a data structure of the menu database 231. The menu database 231 stores menu data records each indicating the data of the menu item provided by the restaurant. The menu data record includes items of an ID, a menu item name, and the like. The ID is menu item identification data set on a per menu item basis for identifying each menu item. The menu item name is a name of the menu item.

Figure 4:
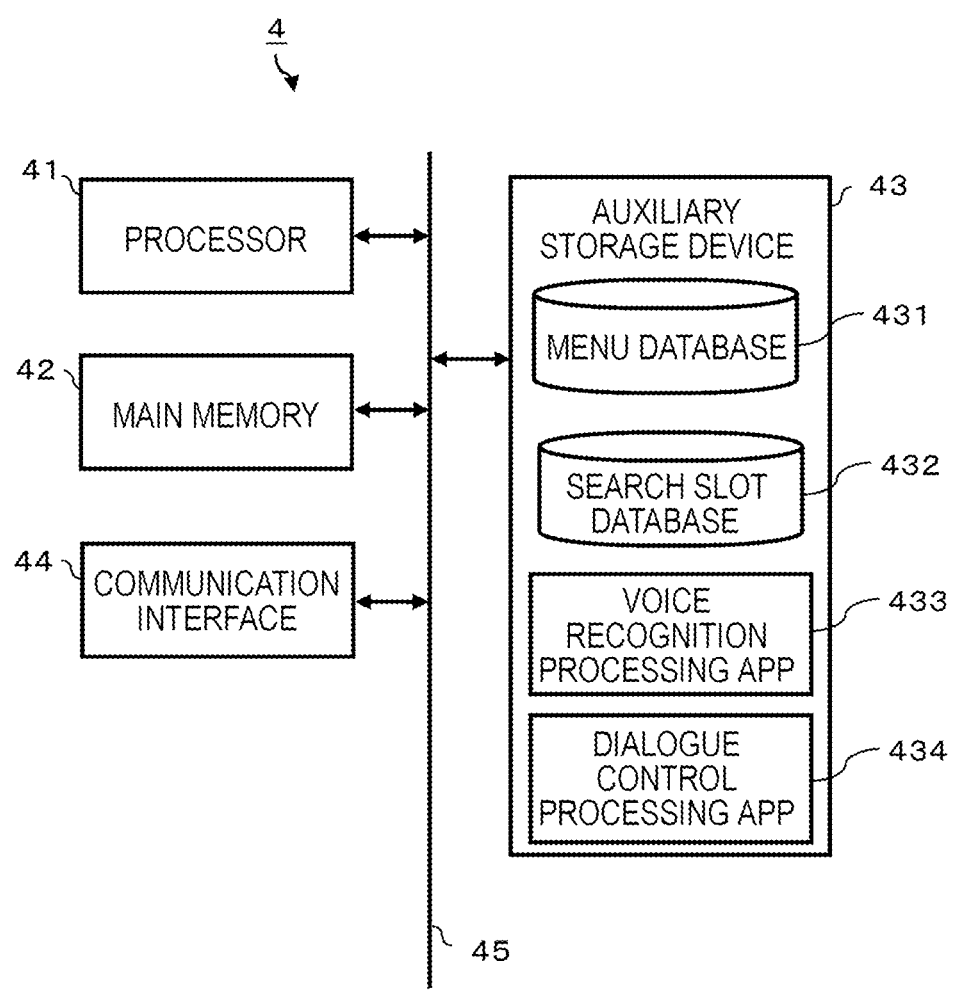
FIG. 4 is a block diagram illustrating a voice dialogue server according to one embodiment.

FIG. 4 is a block diagram illustrating the voice dialogue server 4. The voice dialogue server 4 includes a processor 41, a main memory 42, an auxiliary storage device 43, a communication interface 44, and a system transmission line 45. The system transmission line 45 includes an address bus, a data bus, a control signal line, or the like. In the voice dialogue server 4, the processor 41, the main memory 42, the auxiliary storage device 43, and the communication interface 44 are connected to the system transmission line 45. In one embodiment, the processor 41, the main memory 42, the auxiliary storage device 43, and the system transmission line 45 make up a controller.

The processor 41 controls each unit so as to perform various functions as the voice dialogue server 4 according to an operating system and/or application programs. The processor 41 is, for example, a CPU.

The main memory 42 includes a non-volatile memory area and a volatile memory area. The operating system and/or the application programs are stored in the non-volatile memory area. The data required by the processor 41 for executing the process for controlling each unit is stored in the non-volatile and/or the volatile memory area. The volatile memory area is used as a work area in which the data is temporarily stored by the processor 41. The non-volatile memory area is, for example, a ROM. The volatile memory area is, for example, a RAM.

For example, the auxiliary storage device 43 may be an EEPROM, an HDD, or an SSD. The auxiliary storage device 43 stores data used by the processor 41 for executing various processes and data generated by the process in the processor 41. The auxiliary storage device 43 stores a menu database 431 (see FIG. 5) and a search slot database 432 (see FIG. 6).

The auxiliary storage device 43 may store information processing programs including a voice recognition process application program 433 (hereinafter, referred to as a voice recognition process app 433) and a dialogue control process application program 434 (hereinafter, referred to as a dialogue control process app 434).

The voice recognition process app 433 is an application program for the processor 41 to execute the voice recognition process. The dialogue control process app 434 is an application program for the processor 41 to execute the dialogue control process.

The application programs stored in the main memory 42 or the auxiliary storage device 43 includes one or more control programs relating to the information process executed in the voice dialogue server 4. The method of installing the control program in the main memory 42 or the auxiliary storage device 43 is not particularly limited. The control program may be copied from a removable recording medium or downloaded via the network and installed in the main memory 42 or the auxiliary storage device 43. The form of the recording medium is not particularly limited as long as the recording medium can store a program and can be read by a device. For example, the recording medium is a CD-ROM, a memory card, or the like.

The communication interface 44 is a network interface circuit connectable to the network 9. The communication interface 44 performs data communication with other devices connected via the network 9 according to a communication protocol.

FIG. 5 is a schematic view illustrating a data structure of the menu database 431. The menu database 431 stores menu data records each indicating the data of the menu item provided by the restaurant. The menu data record includes items such as an ID, a menu item name, a slot 1 (type), a slot 2 (food ingredient), a slot 3 (taste), a slot 4 (calories), a slot M (temperature), and a suggestion degree. The ID and the menu item name are configured in the same manner as in the menu database 231. Each of the slots is a category of keywords indicating characteristics of the menu item. For example, types of menu items, contained food ingredients, tastes, calories, and the temperature of the menu items when being served to the customer are set to the slots 1 to M. A plurality of slots can be set in each menu item, and the slots are not limited to the above items. Zero or more keywords can be registered in each slot. Any keyword other than the ones shown in FIG. 5 may be registered. The suggestion degree is a degree of recommendation (or priority) of each menu item and is set by the restaurant in advance. The suggestion degree is used for sorting and prioritizing menu items if the search result shows a plurality of menu items. The suggestion degree is, for example, "1" to "5". "5" has the highest suggestion degree, that is, a menu item having the suggestion degree "5" is prioritized over a menu item having the suggestion degree "1".

FIG. 6 is a schematic view illustrating a data structure of the search slot database 432. The search slot database 432 stores search slot data records each indicating data about a slot of the menu database 431 described above. The search slot data record includes items such as a slot, a slot number, and alias information. The slot number is a number of 1 to M corresponding to the slot. The alias information is information of utterance expression of a keyword correlated to the slot. For example, "pasta" may be expressed as "spaghetti". "Curry" may be uttered as "kari". That is, different expressions related to the same slot are registered in the alias information.

Figure 9:
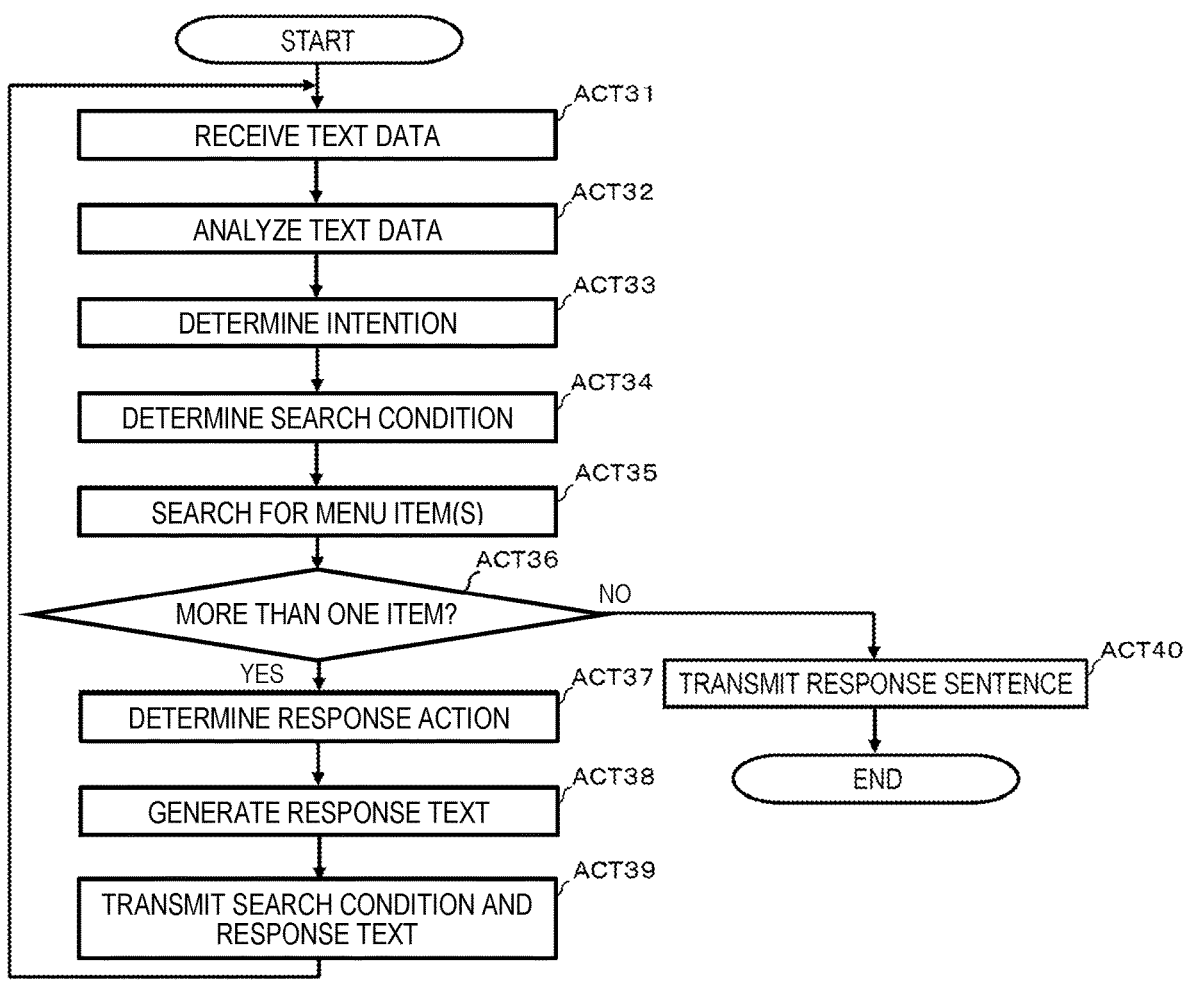
FIG. 9 is a flowchart of a control procedure carried out by a voice dialogue server according to one embodiment.

FIGS. 7 to 9 are flowcharts of control procedures carried out by the voice dialogue server 4.

Hereinafter, by referring to these flowcharts, main operations of the information processing system 1 are described in a case where a customer uses the self-ordering terminal 2 to search for a menu item by his or her voice. The operation described below is an example. If the same result can be acquired, the procedure is not particularly limited.

First, the customer who uses the self-ordering terminal 2 can use the input device 25 (e.g., a touch panel). If the input device 25 is operated, the processor 21 in an idle state will be activated. The processor 21 controls the output device 28 to output a voice, for example, "what would you like to order?". If the customer speaks a word relating to the order to the input device 25, the processor 21 executes the voice dialogue client app 233 according to the procedure shown in FIG. 7.

As Act 11, when a voice (speech) is input by the input device 25, the processor 21 controls the wireless unit 24 to transmit the voice data to the voice dialogue server 4. According to this control, the wireless unit 24 wirelessly transmits the voice data. The voice data is received by the access point 8 and then relayed to the voice dialogue server 4 via the network 9.

The processor 41 of the voice dialogue server 4 executes the voice recognition process app 433 according to the procedure shown in FIG. 8.

The processor 41 acquires the voice data as Act 21. The processor 41 analyzes and recognizes the voice data as Act 22.

The processor 41 generates text data corresponding to a term or phrase uttered by the customer based on the analysis result of the voice data as Act 23. The processor 41 controls the communication interface 44 to transmit the text data as Act 24. According to this control, the text data is transmitted via the communication interface 44. The text data is wirelessly transmitted from the access point 8 via the network 9 and received by the self-ordering terminal 2. Here, the processor 41 ends the process by the voice recognition process app 433 in the procedure presented in the flowchart of FIG. 8.

The description returns back to FIG. 7.

The processor 21 of the self-ordering terminal 2 waits for the text data as Act 12. If the text data is not received from the voice dialogue server 4, the processor 21 determines to be NO in Act 12 and returns to Act 11. If the text data is received from the voice dialogue server 4, the processor 21 determines to be YES in Act 12 and proceeds to Act 13.

As Act 13, the processor 21 controls the wireless unit 24 to transmit the text data to the voice dialogue server 4. According to this control, the wireless unit 24 wirelessly transmits the text data to the voice dialogue server 4. The text data is received by the access point 8 and relayed to the voice dialogue server 4 via the network 9.

The processor 41 of the voice dialogue server 4 executes the dialogue control process app 434 according to the procedure presented in the flowchart of FIG. 9.

The processor 41 receives the text data as Act 31. The processor 41 analyzes the text data using the search slot database 432 as Act 32. For example, if the text data indicates "I'd like to have spaghetti", the processor 41 recognizes that the related slot is "pasta" to which "slot 1" is assigned.

The processor 41 determines the intention of the customer who has uttered the text as Act 33. That is, the processor 41 determines the customer's thought based on the words spoken by the customer. Here, the intention is indicated by a behavior of the customer and the slot and the slot number correlated to that behavior. The behavior of the customer is, for example, adding a search condition, changing a search condition, deleting a search condition, and resetting a search condition. The search condition is a set of one or more slots. For example, when the recognized slot is "pasta (slot 1)", the processor 41 determines the utterance intention to be adding "pasta (slot 1)" to the search condition. The determination process of the utterance intention is well-known in the process of the related art, and thus the description thereof is omitted.

The processor 41 determines the search condition as Act 34. For example, provided that the current search condition is "tomato (slot 2)", if the utterance intention determined in ACT 33 is to add to the search condition "pasta (slot 1)", the processor 41 determines the new search condition by adding the condition about "pasta (slot 1)" to the current search condition. As a result, the new search condition including "pasta (slot 1)" and "tomato (slot 2)" are determined. The processor 41 updates the search condition whenever additional text data is received.

The processor 41 searches for a menu item that satisfies the search condition by using the menu database 431 as Act 35. As Act 36, the processor 41 confirms whether there is one search result, that is, whether one menu item is confirmed. If a plurality of menu items are found as the search result, the processor 41 determines to be YES in Act 36 and proceeds to Act 37.

The processor 41 determines a response action to the customer as Act 37. Here, the response action is indicated by a response type and information about the slot correlated to the response type. The response type is, for example, a suggestion of a menu item, inquiry about a search condition, or confirmation of a search condition. If the plurality of menu items are found by the search, and if there is a slot that is not included in the search condition at this point, the processor 41 narrows the number of items by issuing an inquiry about an additional slot to the customer. For example, if the slot 1 is not yet included in the search condition, the processor 41 issue an inquiry about a type of a menu item desired by the customer. Here, the "type" corresponds to "slot 1" is selected. For example, such a suggestion is made in the numerical order of the slots 1 to M, assuming that the designation of a type (slot 1) is likely to narrow the search compared with the slot M. Since a determination process of the response action is well-known in the process of the related art, and thus the description thereof is omitted.

The processor 41 generates a response text based on the search result and the response action as Act 38. For example, if the response action is to inquire the type of the menu item described above, the processor 41 generates a response text such as "is there any specific type of menu items that you would like to order?" At the same time, the processor 41 controls the communication interface 44 to transmit information about the search result (e.g., the ID and/or the name of the menu item(s) found by the search) to the self-ordering terminal 2.

As Act 39, the processor 41 controls the communication interface 44 to transmit data indicating the search condition and the response text. According to this control, the data indicating the search condition and the response text is transmitted via the communication interface 44. The data of the search condition and the response text is wirelessly transmitted from the access point 8 via the network 9 and received by the self-ordering terminal 2. After the data of the search condition and the response text is transmitted, the processor 41 returns to Act 31.

If only one menu item is confirmed as a result of the search in ACT 35, the processor 41 determines to be NO in Act 36 and proceeds to Act 40. The processor 41 determines a response action to the customer and generates a response text based on the determined response action. That is, the processor 41 generates a response text that suggests the menu item found by the search to the customer. As Act 40, the processor 41 controls the communication interface 44 to transmit the generated response text. According to this control, the response text is transmitted via the communication interface 44. The response text is wirelessly transmitted from the access point 8 via the network 9 and received by the self-ordering terminal 2. In the above, the processor 41 ends the process by the dialogue control process app 434 in the procedure presented in the flowchart of FIG. 9.

The description returns back to FIG. 7.

The processor 21 of the self-ordering terminal 2 that controls the transmission of the text data in Act 13 receives the data indicating the search condition and the response text, or the response text only, from the voice dialogue server 4 as Act 14. If the search condition and the response text are received, a plurality of menu items may be found as the search result. If only the response text is received, one menu item may be confirmed.

The processor 21 converts the response text into voice data as Act 15. The processor 21 controls the output device 28 to output the voice as Act 16. In the above, the processor 21 ends the process by the voice dialogue client app 233 in the procedure presented in the flowchart of FIG. 7.

FIGS. 10 to 13 are schematic views illustrating menu item screens 100 and 109 to 111 displayed on the display device 26 of the self-ordering terminal 2.

Hereinafter, by using these schematic views, the menu item screens 100 and 109 to 111, which are displayed on the display device 26 if the customer operates the self-ordering terminal 2 to search for a menu item by his or her voice, are described. For example, the images shown in the screens 100 and 109 to 111 are stored in the self-ordering terminal 2 or a server (e.g., the voice dialogue server 4 or the order station server 5), and each screen shows those images and is updated according to signals issued by the server.

Figure 10:
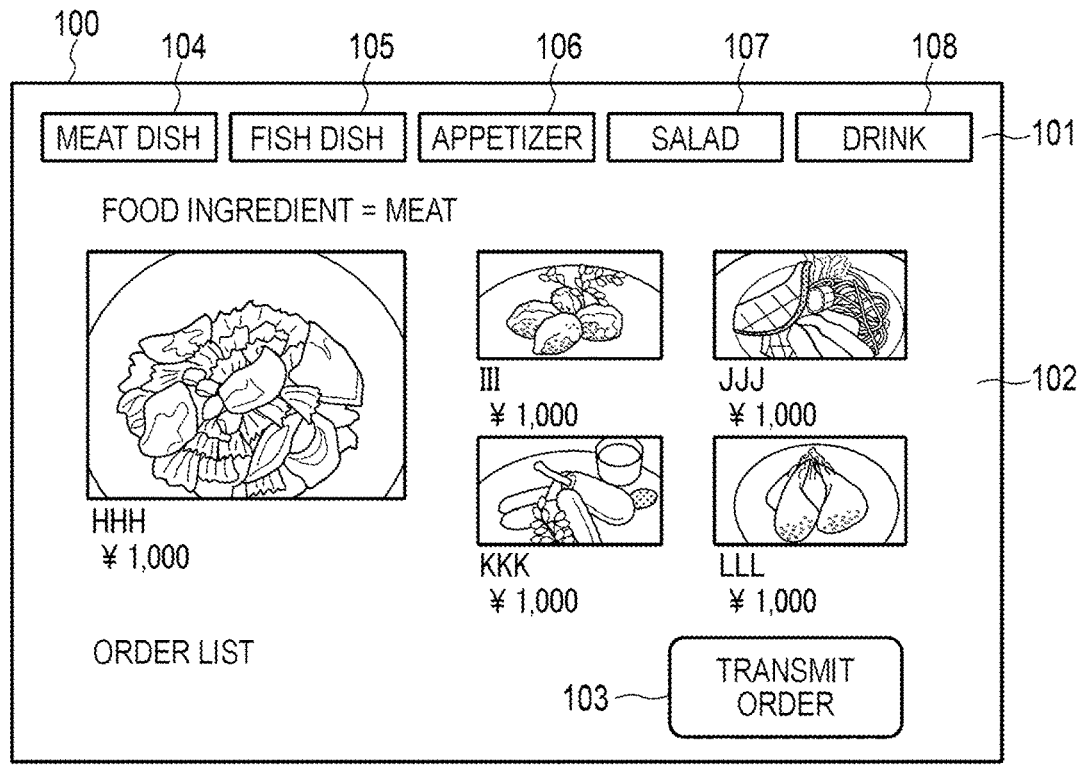
FIG. 10 is a schematic view illustrating a menu item screen displayed on a self-ordering terminal according to one embodiment.

FIG. 10 is a schematic view illustrating the menu item screen 100 displayed on the self-ordering terminal 2. The menu item screen 100 illustrated in FIG. 10 includes images of a food category display area 101, a menu item display area 102, and an order transmission button 103 for transmitting an order. The food category display area 101 is an area for displaying a category of food, for example, images of a meat dish button 104, a fish dish button 105, an appetizer button 106, a salad button 107, and a drink button 108. The customer may browse menu items by touching the buttons 104 to 108 of the food categories. The menu item display area 102 is an area for displaying one or more menu items searched in a dialogue form by a voice. The menu item display area 102 includes: a text indicating a search condition; an image, a menu item name, and a price of each menu item found by the search; and an order list. The price is a unit price of a menu item corresponding to the menu item name included in the menu data records of the menu database 231 and the menu database 431. The price may be included as the item of the menu data record of the menu database 231 or the menu database 431. In the order list, the name of each menu item that is being been ordered and the ordered quantity or number are displayed. In the example of FIG. 10, since the menu item has not been ordered, the menu item name and the number of ordered items are not displayed.

If a plurality of menu items are listed in the menu item display area 102, for example, the top five menu items having high suggestion degrees are displayed. The menu item having the highest suggestion degree is displayed with a larger image. The content and the image of the text data displayed in FIG. 10 are examples. The menu item screen 100 may show a message for notifying the customer of the menu item(s) of the search result. The menu item screen 100 is a screen to be displayed in response to a customer's voice. For example, the menu item screen 100 shown in FIG. 10 is displayed when the customer says "I want to have a meat dish." in response to the inquiry "what do you like to order?" that is output from the output device 28. Subsequently, the customer may place an order by speaking, for example, "I'll have that." without touching the order transmission button 103.

Figure 11:
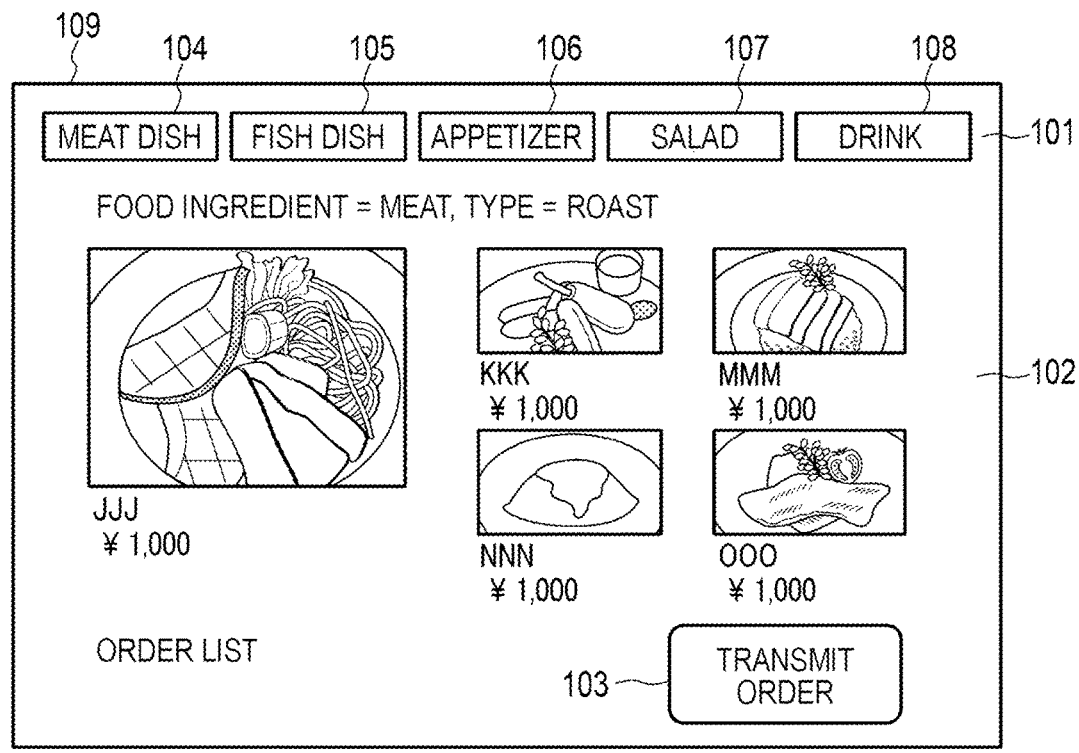
FIG. 11 is a schematic view illustrating a menu item screen in which a condition is added.

FIG. 11 is a schematic view illustrating the menu item screen 109 displayed in the self-ordering terminal 2 after the search condition is added. Since a plurality of menu items are found by the search using the search condition illustrated in FIG. 10, the processor 41 of the voice dialogue server 4 issues an inquiry about a slot that is not yet included in the search condition. If the customer speaks some words in response to the inquiry, text data relating to the search condition are added to the menu item display area 102 illustrated in FIG. 11, and the menu items as the search result are updated based on the updated search condition. The menu item screen 109 is a screen displayed in response to the customer's response, for example, "I'd like to have a roast." in response to the inquiry "is there a specific type of menu items that you would like to order?" that is output from the output device 28. In this manner, the number of menu items are narrowed until there is one search result.

Figure 12:
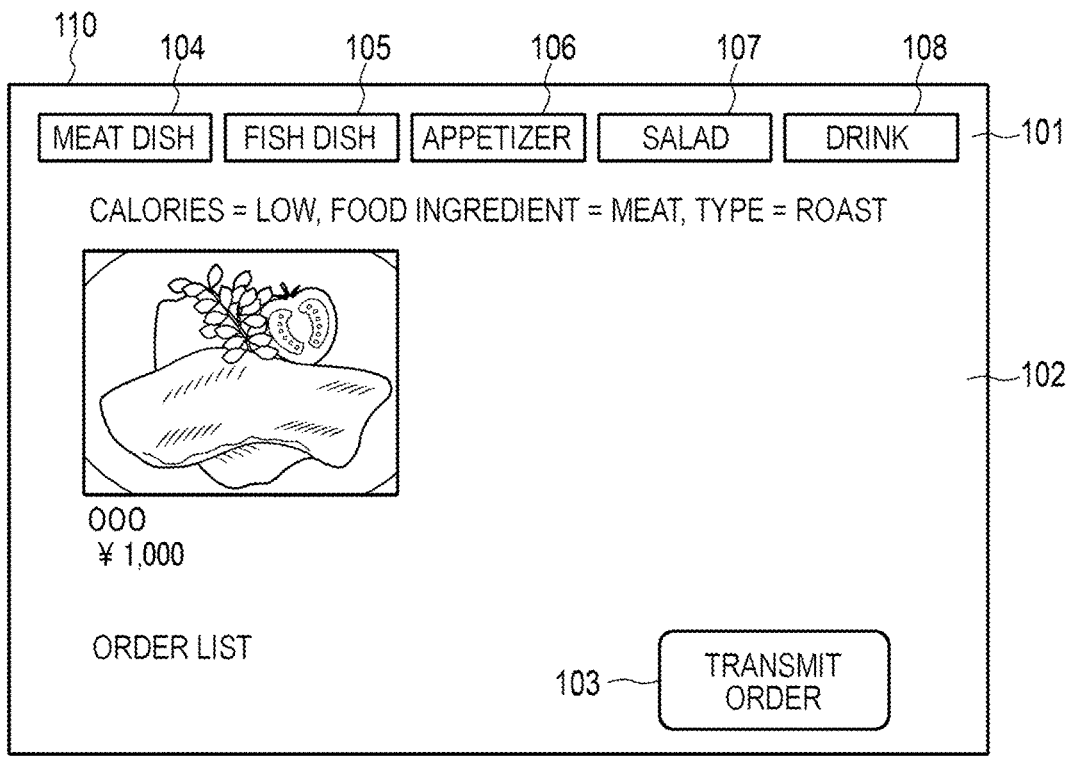
FIG. 12 is a schematic view illustrating a menu item screen showing a search result.

FIG. 12 is a schematic view illustrating the menu item screen 110 in which only one menu item is displayed on the self-ordering terminal 2. A large image of the menu item is displayed in the menu item display area 102 as illustrated in FIG. 12. The menu item screen 110 is a screen displayed when a suggestion is made to the customer by a message, for example, "how about 'OOO' as a meat roast with low calories?" that is output from the output device 28. The order of the menu item is placed when the customer touches the order transmission button 103 or input another voice command.

Figure 13:
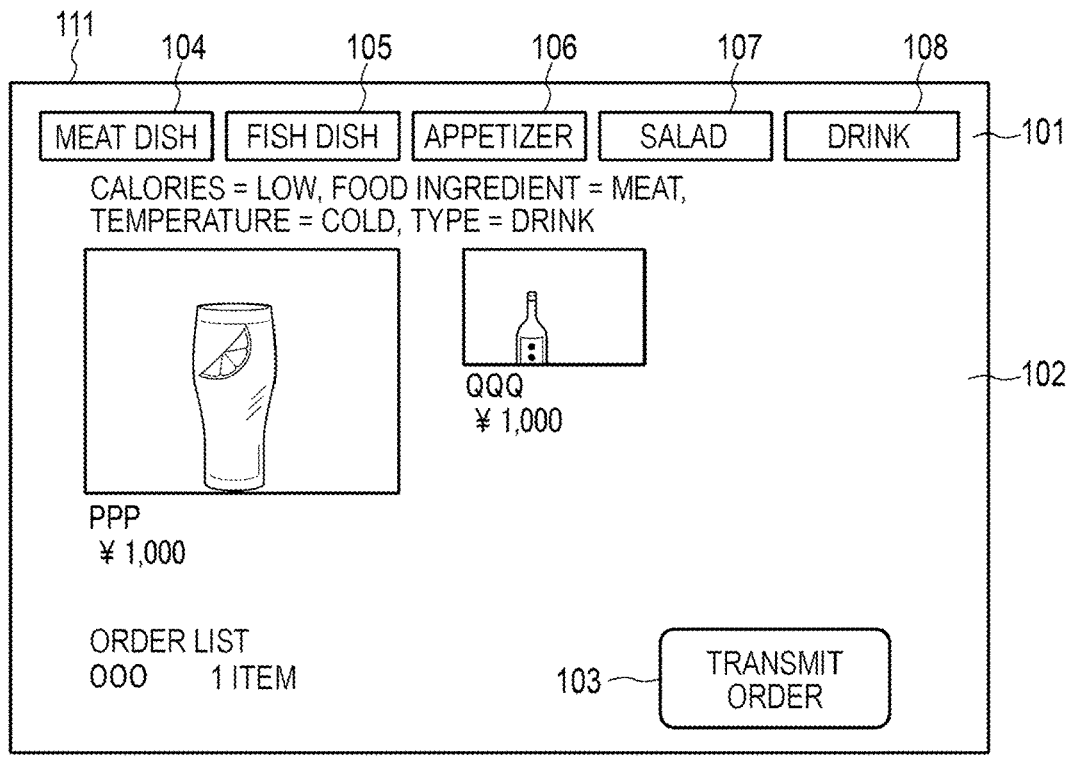
FIG. 13 is a schematic view illustrating a menu item screen for ordering an additional item.

FIG. 13 is a schematic view illustrating the menu item screen 111 displayed on the self-ordering terminal 2 when the customer orders another menu item. If the customer orders the menu item illustrated in FIG. 12, the ordered menu item name and the quantity of the ordered items are displayed in the order list of the menu item display area 102 as illustrated in FIG. 13. Here, the customer may order another menu item. For example, after the meat dish is ordered, if the customer wants to order a drink but does not have a specific menu item in his or her mind, the processor 41 of the voice dialogue server 4 searches for a drink that goes with the meat dish. In such a case, the processor 41 adds a new keyword to the search condition that has been used to order the menu item in the order list. A suggestion of a menu item or an inquiry about a search condition based on the search result is made by operations of the processor 41. The menu item of the result searched in this manner is displayed in the menu item display area 102 illustrated in FIG. 13. The menu item screen 111 is a screen displayed when a voice "how about 'PPP' as a cold drink with low calories that goes with a meat dish?" is output from the output device 28 in response to the customer's voice input "what do you have for a drink?".

As clearly described in the above, the processor 41 of the voice dialogue server 4, which is an example of an information processing device, acquires the data of a voice uttered by a customer by executing a process in Act 21 of FIG. 8.

The processor 41 of the voice dialogue server 4 analyzes the voice data by executing the process in Act 22 of FIG. 8.

The processor 41 of the voice dialogue server 4 determines a search condition for searching for one or more menu items based on the analysis result by executing the process in Act 34 of FIG. 9.

The processor 41 of the voice dialogue server 4 searches for the menu items that satisfy the determined search condition by executing the process in Act 35 of FIG. 9.

The processor 41 of the voice dialogue server 4 generates a response text based on the search result by executing the process in Act 38 of FIG. 9.

Therefore, by the information processing system 1 including such an information processing device, one or more menu items can be searched with interactive voice commands. If a plurality of menu items are found as the search result, the voice dialogue server 4 issues an inquiry about a category keyword (i.e., a slot) that is not included in the search condition. Accordingly, an effective search can be conducted based on the existing keywords. Further, by selecting a slot that is not included in the existing search condition in a numerical order of the slots 1 to M, it is possible to issue an inquiry to the customer to narrow down the search result and make a suggestion effectively.

Further, the processor 41 of the voice dialogue server 4 performs a search using a priority order predetermined for each menu item. When there are two or more menu items found by the search, the processor 41 generates a response text on a menu item having the highest priority among the other menu items, which will help a customer decide what to eat or drink.

In the above, embodiments of the information processing device, the information processing system, and the control method thereof are described, but the embodiments are not limited thereto.

In the above embodiments, a customer operates the self-ordering terminal 2 in a restaurant to search for a menu item by a voice command. However, the self-ordering terminal 2 may be used in stores or facilities other than the restaurant. For example, the self-ordering terminal 2 may be a terminal used in a karaoke store to search for a song or a digital signage displayed in a public space.

In the above embodiments, a suggestion degree is set in advance by a restaurant in order to sort and narrow down menu items in a priority order if a plurality of menu items are found by the search. For example, the menu items may be sorted and narrowed down by an order of high or low prices of menu items, an order of periods of time for cooking menu items, and an order of periods of time for serving menu items considering the congestion level of the restaurant.

In the above embodiments, it is described that, if only one menu item is found by the search, the voice dialogue server 4 transmits a response text that suggests the menu item to the customer to the self-ordering terminal 2. For example, the voice dialogue server 4 may transmit the data indicating the search condition and the response text to the self-ordering terminal 2. The embodiments are not limited to a case where one menu item is found. For example, if the number of menu items is equal to or less than a threshold value, the voice dialogue server 4 may transmit a response text for suggesting each menu item with the highest priority among these to the self-ordering terminal 2. In such a case, the limited number of the menu items, that is equal to or less than the threshold value, are displayed in the menu item display area of the menu item screen. The menu item having the highest priority is displayed with a larger image.

In the embodiments, the voice dialogue server 4 is described as one aspect of an information processing device. For example, the voice dialogue server 4 further including a function as the order station server 5 may be used as the information processing device. In other words, the order station server 5 including a function as the voice dialogue server 4 may be used as the information processing device.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device, comprising:
a network interface; and
a processor configured to:
acquire voice data via the network interface,
analyze the acquired voice data,
based on analysis of the acquired voice data, determine a search condition including one or more keywords for searching for one or more items,
perform a search using the determined search condition,
generate a first text indicating an item found by the search, and
control the network interface to output the generated first text, wherein
the processor is further configured to, when two or more items are found by the search, generate a second text suggesting another keyword other than said one or more keywords that have been used for the search, and controls the network interface to output the generated second text.

2. The information processing device according to claim 1, wherein the search is performed using a priority value assigned to each of items to be searched.

3. The information processing device according to claim 2, wherein the processor is further configured to, when two or more items are found by the search, generate a third text indicating one of the items having the greatest priority value.

4. The information processing device according to claim 1, further comprising:
a database storing item information about each item sold or served at a place, wherein
the voice data is received from a terminal installed at the place via the network interface.

5. The information processing device according to claim 4, wherein the processor is further configured to, upon receipt of a new keyword that is input by a customer using the terminal, perform a new search using said one or more keywords included in the search condition and the received new keyword and generate a fourth text indicating an item found by the new search.

6. The information processing device according to claim 5, wherein the fourth text suggests the customer order the item found by the new search.

7. The information processing device according to claim 1, wherein the processor is further configured to convert the first text into voice data and control the network interface to output the voice data.

8. An information processing system, comprising:
a terminal that includes an input device through which a voice is input and an output device through which a voice is output; and
an information processing device that includes:
a network interface, and
a processor configured to:
acquire first voice data of a voice that is input via the input device of the terminal,
analyze the first voice data,
based on the analysis of the first voice data, determine a search condition including one or more keywords for searching for one or more items,
perform a search using the determined search condition,
generate a first text indicating an item found by the search,
convert the generated first text to second voice data that can be output from the output device of the terminal, and
control the network interface to transmit the second voice data to the terminal, wherein
the processor is further configured to, when two or more items are found by the search, generate a second text suggesting another keyword other than said one or more keywords that have been used for the search, convert the second text to third voice data, and control the network interface to transmit the third voice data to the terminal.

9. The information processing system according to claim 8, wherein the search is performed using a priority value assigned to each of items to be searched.

10. The information processing system according to claim 9, wherein the processor is further configured to, when two or more items are found by the search, generate a third text indicating one of the items having the greatest priority value, convert the third text to fourth voice data, and control the network interface to transmit the fourth voice data to the terminal.

11. The information processing system according to claim 8, wherein
the terminal further includes a display device configured to display information about one or more items sold or served at a place, and
the information processing device further includes a database storing item information about each of the items sold or served at the place.

12. The information processing system according to claim 11, wherein the processor is further configured to:
upon receipt of a new keyword that is input by a customer using the terminal, perform a new search using said one or more keywords included in the search condition and the received new keyword,
generate a fourth text indicating an item found by the new search,
convert the fourth text into fifth voice data, and
control the network interface to transmit the fifth voice data to the terminal.

13. The information processing system according to claim 12, wherein the display device includes a touch panel, and the new keyword is input through the display device showing a button corresponding to the new keyword.

14. The information processing system according to claim 12, wherein the new keyword is input by the input device of the terminal.

15. The information processing system according to claim 12, wherein the fourth text suggests the customer order the item found by the new search.

16. The information processing system according to claim 8, wherein the terminal further includes a display device configured to display an image of the item found by the search when the second voice data is output by the output device.

17. The information processing system according to claim 16, wherein the display device is further configured to display said one or more keywords that have been used for the search.

18. The information processing system according to claim 16, wherein the display device is further configured to display a button to order the item found by the search when the second voice data is output by the output device.

19. The information processing system according to claim 18, further comprising:

an order station server configured to receive the order of the item placed by the terminal; and a printer configured to print information about the item, the order of which is received by the order station server.

20. A method carried out by an information processing device, the method comprising:

acquiring voice data via a network interface;

analyzing the acquired voice data;

determining a search condition including one or more keywords for searching for one or more items based on analysis of the acquired voice data;

performing a search using the determined search condition;

when one item is found by the search, generating a text indicating the item found by the search;

when two or more items are found by the search, generating a text suggesting another keyword other than said one or more keywords that have been used for the search; and outputting the generated text via the network interface.

* * * * *